United States Patent
Manianchira et al.

(10) Patent No.: US 8,695,092 B2
(45) Date of Patent: Apr. 8, 2014

(54) HOST IP REPUTATION

(75) Inventors: Manu Manianchira, Redmond, WA (US); Prabu Raju, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 12/961,142

(22) Filed: Dec. 6, 2010

(65) Prior Publication Data

US 2012/0144481 A1    Jun. 7, 2012

(51) Int. Cl.
*H04L 29/06*    (2006.01)
(52) U.S. Cl.
CPC ........ *H04L 63/1441* (2013.01); *H04L 63/1408* (2013.01)
USPC .......................................................... 726/22
(58) Field of Classification Search
CPC .................... H04L 63/1441; H04L 63/1408
USPC ............................................................ 726/22
See application file for complete search history.

(56) References Cited

U.S. PATENT DOCUMENTS

| | | | |
|---|---|---|---|
| 7,409,708 B2 | 8/2008 | Goodman et al. | |
| 7,464,264 B2 | 12/2008 | Goodman et al. | |
| 8,205,239 B1* | 6/2012 | Satish | 726/1 |
| 2006/0015942 A1* | 1/2006 | Judge et al. | 726/24 |
| 2006/0031483 A1* | 2/2006 | Lund et al. | 709/224 |
| 2006/0253584 A1 | 11/2006 | Dixon et al. | |
| 2006/0288076 A1 | 12/2006 | Cowings et al. | |
| 2007/0192855 A1* | 8/2007 | Hulten et al. | 726/22 |
| 2008/0022384 A1* | 1/2008 | Yee et al. | 726/11 |
| 2008/0134285 A1 | 6/2008 | Kim et al. | |
| 2008/0282338 A1 | 11/2008 | Beer | |
| 2009/0063371 A1 | 3/2009 | Lin | |
| 2009/0216841 A1 | 8/2009 | Choi et al. | |
| 2010/0186088 A1 | 7/2010 | Banerjee et al. | |

OTHER PUBLICATIONS

Esquivel, et al., "On the Effectiveness of IP Reputation for Spam Filtering", Retrieved at << http://ieeexplore.ieee.org/stamp/stamp.jsp?arnumber=05431981, Jan. 9, 2010, pp. 10.
"Spam Defense Layers—Retrieved Date",Retrieved at << http://www.barracudanetworks.com/ns/technology/anti-spam-tech.php >>, Retrieved date: Oct. 19, 2010, pp. 4.
"McAfee's TrustedSource", Retrieved at << http://www.trustedsource.org/en/about/faq >>, Retrieved Date: Oct. 19, 2010, pp. 2.
"IP Reputation Investigation", Retrieved at http://ipremoval.sms.symantec.com/lookup , Retrieved Date: Oct. 19, 2010, pp. 4.
Ehrlich, et al., "Detection of Spam Hosts and Spam Bots Using Network Flow Traffic Modeling", Retrieved at << http://www.usenix.org/event/leet10/tech/full_papers/Ehrlich.pdf >>, Proceedings of the 3rd USENIX conference on Large-scale exploits and emergent threats: botnets, spyware, worms, 2010, pp. 8.

(Continued)

*Primary Examiner* — Michael S McNally
(74) *Attorney, Agent, or Firm* — Bryan Webster; Andrew Sanders; Micky Minhas

(57) ABSTRACT

Various embodiments described above are directed to identifying abuse-hosting services at their source, rather than using such intermediaries as URLs and associated domains. In one or more embodiments, threats can be blocked by using the Internet protocol (IP) address of an identified attacker that is hosting content associated with abuse.

19 Claims, 5 Drawing Sheets

(56) References Cited

OTHER PUBLICATIONS

"SenderBase Reputation Score", Retrieved at << http://www.ironport.com/pdf/ironport_senderbase_reputationscore_overview.pdf >>, Retrieved Date: Oct. 19, 2010, pp. 4.

"M86 MailMarshal™ IP Reputation Service", Retrieved at << http://www.m86security.com/documents/pdfs/datasheets/email_security/DS_IP_Reputation_Service.pdf , Retrieved Date: Oct. 19, 2010, pp. 2.

* cited by examiner

HOST IP REPUTATION

BACKGROUND

Malware, phishing, and spamming attacks continue to proliferate in the Internet environment. Past attempts to block this proliferation have focused on, and been based off of the Universal resource locator (URL) associated with content that is linked to malware, phishing, and spamming activities. This has led to a lag in thwarting such attacks due, at least in part, to the difficulty in chronicling an URL and its various variants.

Studies have indicated that, in at least some instances, new domains quickly appear and serve the same malware every time a domain associated with such malware goes down. Moreover, heuristics associated with hash-based or signature-based approaches can be circumvented by slightly changing the binaries associated with identified domains.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are directed to identifying abuse-hosting services at their source, rather than using such intermediaries as URLs and associated domains. In one or more embodiments, threats can be blocked by using the Internet Protocol (IP) address of an identified attacker that is hosting content associated with abuse.

In at least some embodiments, an IP reputation service hosts information associated with various IP addresses that have been identified to host abuse content such as malware, phishing content, and/or spam, to name just a few. This information can then be used to block or warn end-users that particular IP addresses that are serving a request have been identified to host abuse content. In at least some embodiments, the IP reputation service can work with and coexist with URL-based solutions that are already in place.

BRIEF DESCRIPTION OF THE DRAWINGS

The same numbers are used throughout the drawings to reference like features.

DETAILED DESCRIPTION

Overview

Various embodiments are directed to identifying abuse-hosting services at their source, rather than using such intermediaries as URLs and associated domains. In one or more embodiments, threats can be blocked by using the Internet Protocol (IP) address of an identified attacker that is hosting content associated with abuse.

In at least some embodiments, an IP reputation service hosts information associated with various IP addresses that have been identified to host abuse content such as malware, phishing content, and/or spam, to name just a few. This information can then be used to block or warn end-users that particular IP addresses that are serving a request have been identified to host abuse content. In at least some embodiments, the IP reputation service can work with and coexist with URL-based solutions that are already in place.

In the discussion that follows, a section entitled "Example Operating Environment" is provided and describes one operating environment in which one or more embodiments can be employed. Following this, a section entitled "Implementation Example" describes an example implementation in accordance with one or more embodiments. Last, a section entitled "Example System" describes an example system that can be used to implement one or more embodiments.

Consider now an example operating environment in which one or more embodiments can be implemented.

Example Operating Environment

Figure 1:
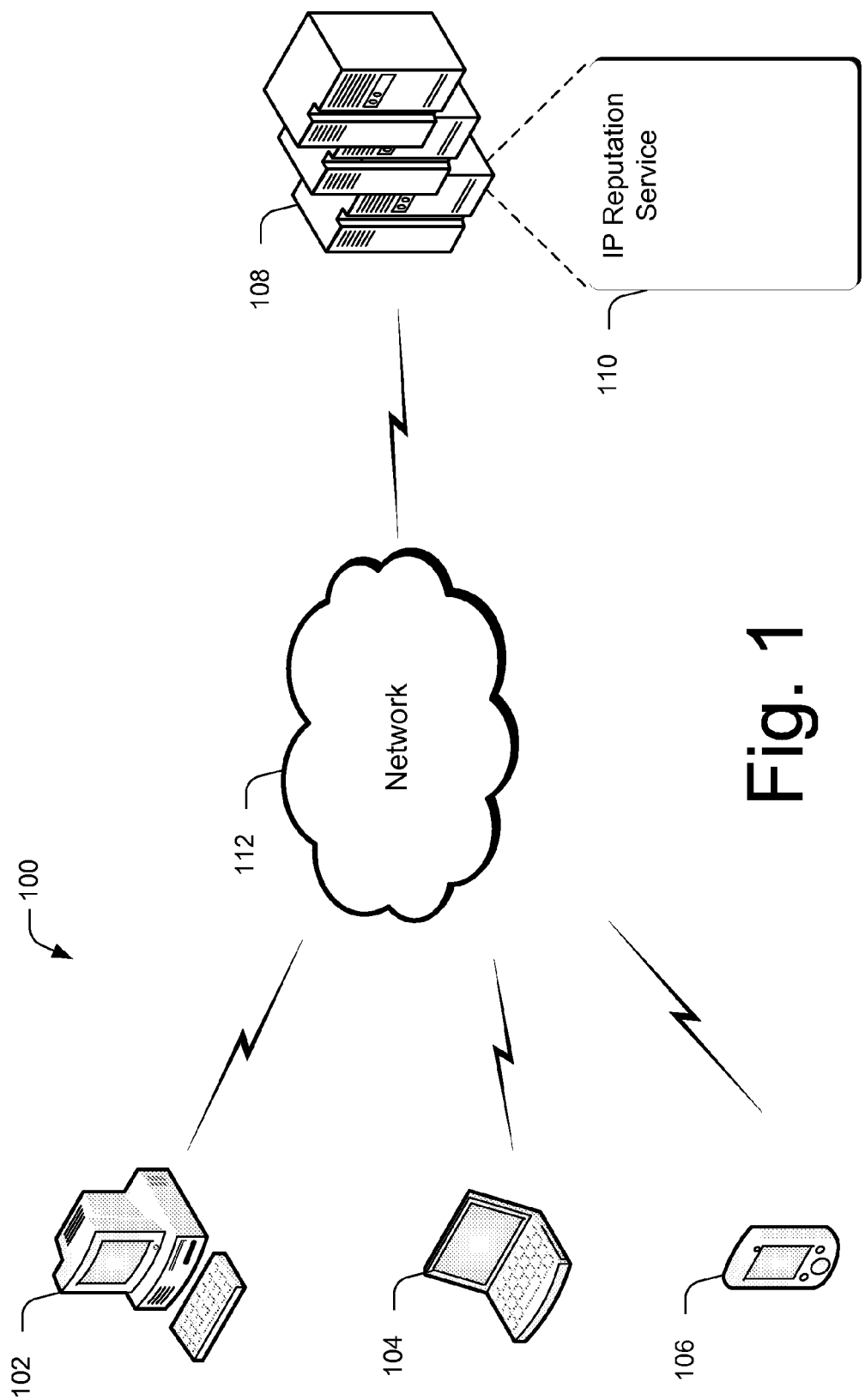
FIG. 1 is an illustration of an environment in an example implementation in accordance with one or more embodiments.

FIG. 1 illustrates an example operating environment in which the inventive host IP reputation service can be employed in accordance with one or more embodiments.

Illustrated environment 100 can include a variety of different types of computing devices and components that can utilize the IP reputation service about to be described below.

For example, computing devices can include a desktop computing device 102, a laptop computing device 104, and/or a mobile device 106. It is to be appreciated and understood, however, that the computing device can assume any type or form of computing device including, but not limited to, various other types of client devices, netbooks, set-top boxes, and the like. Typically, such computing devices include one or more processors and one or more computer-readable storage media that may be configured in a variety of ways.

In addition, environment 100 includes a server or servers 108 that host an IP reputation service 110 that operates as described above and below. Any number of servers can be utilized. For example, the IP reputation service can be implemented on multiple servers and/or computing devices in a distributed fashion. For example, when a request is received, the request can be partitioned by IP address or IP address range into a set of servers which could respond to the request.

The IP reputation service 110 can be implemented in connection with any suitable type of hardware, software, firmware or combination thereof. In at least some embodiments, the IP reputation service 110 is implemented in software that resides on some type of tangible, computer-readable storage medium. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 5.

Typically, the various computing devices 102, 104, and 106 communicate with server(s) 108 via some type of suitably-configured network 112. This network can include, by way of example and not limitation, a wide area network, a local area network, an intranet, the Internet, and the like.

IP reputation service 110 is representative of functionality that identifies abuse-hosting services at their source, rather than using such intermediaries as URLs and associated domains. In one or more embodiments, threats can be blocked by using the Internet protocol (IP) address of an identified attacker that is hosting content associated with abuse.

In at least some embodiments, IP reputation service 110 hosts information associated with various IP addresses that have been identified to host abuse content such as malware, phishing content, and/or spam, to name just a few. This information can then be used to block or warn end-users that particular IP addresses that are serving a request have been identified to host abuse content. In at least some embodiments, the IP reputation service can work with and coexist with current URL-based solutions that are already in place.

In operation, as described below, when a computing device or component attempts to access a particular URL, a message is sent to the IP reputation service which then checks to see whether the URL is associated with an IP address that has been identified as one that hosts abuse content. If a corresponding IP address is found for the URL, then a warning can be issued or access can otherwise be blocked.

Having described an example operating environment, consider now a discussion of an example implementation in accordance with one or more embodiments.

Implementation Example

Figure 2:
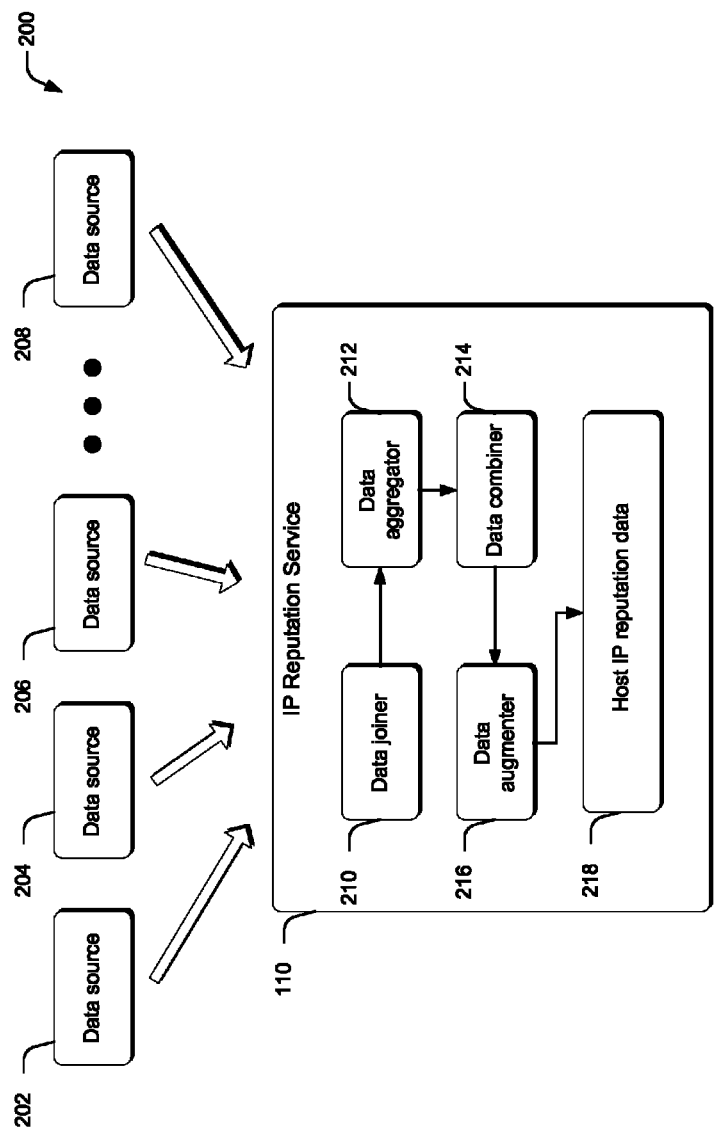
FIG. 2 illustrates an example system in accordance with one or more embodiments.

FIG. 2 illustrates an example system in accordance with one or more embodiments generally at 200. System 200 includes, in this example, a plurality of data sources examples of which are shown at 202, 204, 206, and 208. Any suitable number and/or type of data source can be utilized. Data sources 202-208 provide data to IP reputation service 110 for processing as described above and below. The data sources can provide URL-based information that is associated with URLs that have been identified to host abuse content. This data is collected by the IP reputation service and comprehensively processed and analyzed to produce reputation data that is then used to identify IP addresses that are associated with abuse content, as will become apparent below.

In this particular example, IP reputation service 110 includes a data joiner 210, a data aggregator 212, a data combiner 214, and a data augmenter 216 that collectively work together to process data provided by the data providers to produce host IP reputation data 218.

Data sources 202-208 are configured to provide data associated with so-called abuse vectors including, by way of example and not limitation, phishing vectors, malware vectors, URL abuse vectors such as Windows Live URL abuse vectors, and/or SPAM URL abuse vectors and the like. The data from the data sources provide seed data to a workflow that is undertaken by IP reputation service 110. The output of the IP reputation service's workflow provides host IP reputation data 218 which serves as the backbone of the host IP reputation service.

Any suitable type of data sources can be utilized. In at least some embodiments, the data sources can provide data that can include, by way of example and not limitation, browser telemetry log data, service activity data, abuse instrumentation log data, mail feed data, and/or abusive URL data feeds from other services.

An example of browser telemetry log data is as follows:

```
{2CEDBFBC-DBA8-43AA-B1FD-
CC8E6316E3E2},8.0.6001.9,8.00.6001.18669,5.1.2600.3.0,ja,{F08EE49F-D6A6-
468E-8585-4CFB3DE266AE},POST,ID,http://10.8.70.4/imart/chgr-
dormi_account_book_nopc_list_jsp.service?operation=doBack&strMonthStartToE
nd=2010/10/16~2010/11/15,b4ae69ad-5394-e54d-5868-
099792bdce3d,http://10.8.70.4/imart/system(2f)security(2f)common(2f)top.jssps?i
m_mark=g-p 8dtb*-
mihfar&im_from=system(2f)security(2f)user(2f)main&scrolling=no&name=IM_T
OP,NFHN,6.5,100,6.5,100,0,FRAME,2010-11-15
23:00:00.0000,NULL,10.8.70.4,10.8.70.4,3a003a00,532000|0|0|20000020|1FC2|0,
c9703589-12f1-b40a-b9ee-
266caa619552,0,64,100,100,75,NULL,7.3,PSHSUP,57e6e849-fcc1-4605-b27f-
24607051cbd4
```

An example of server activity data is as follows:

```
Server 000001C3653643A0BC2CA65BA5B652D5      ae41
       62DEC69B0302F15403FB6096FFFFFFFF       WC.Hotmail 11/12/2010
2:30:07 PM 4294967297 Experience.Inception
       RequestID|001ae41cf98|DomainIdentifier|10420|Market|en-
US|PromoMarket|en-
US|UserGender|u|FrontendBrowser|Other|FrontendBrowserVersion|0.-
1|ServerName|BLU105-
W13|ControlVersion|15.40.1082|MUID|515E51E154464C49B0344E6949D3F822|
UserState|Unauthenticated|EID|Prod|PropertyVersion|15.4.327      10.8.70.4
```

An example of abuse instrumentation log data is as follows:

```
Server 5F868FA4148F421498B05551B7FCD257            4919
       11/12/2010 8:50:23 PM           115964116996        Abuse.Report
       HeaderKey|N6v|RequestID|01b491940c4|DomainIdentifier|13280|Reporter
CID|-reportercid|AbuseReporterReputation|5|AbuseReportReferralURL|http://cid-
de31a8c80a8ef71f.profile.live.com/invites|AbuseReportPlatform|1|AbuseObjectUr
```

-continued

1|http://cid-
de31a8c80a8ef71f.profile.live.com/invites|AbuseReportSubmitIPAddress|90.54.15
7.227|ContentTypeID|2|ContentSubTypeID|5|AbuseObjectID|Invitation|ContentO
wnerCID|0|AbuserCID|-cid      10.8.70.4

An example of mail feed data is as follows:

```
84.235.75.21 209.85.216.185      11/15/2010 8:02:09 AM
     www.lovely0smile.com/vcard/images/052.jpg
lovely0smile.com/images/card/228.jpg
www.5aledyat.com/vb/uploaded/8394_01208579882.gif
www.5aledyat.com/vb/uploaded/8394_01208579882.gif
www.5aledyat.com/vb/uploaded/8394_01208579882.gif
www.5aledyat.com/vb/uploaded/8394_01208579882.gif
www.5aledyat.com/vb/uploaded/8394_01208579882.gif
www.5aledyat.com/vb/uploaded/8394_01208579882.gif
canonicalizer.ucsuri.tcs/68007400740070003a002f002f0064006f00630075006d00
65006e0074002e007400690074006c0065003b00
s7.addthis.com/js/addthis_widget.php?v=12
canonicalizer.ucsuri.tcs/68007400740070003a002f002f00750072006c003b00
www.sahab-alkher.com/ www.sahab-alkher.com/
groups.google.com.sa/group/sahab-alkher?hl=ar
groups.google.com.sa/group/sahab-alkher?hl=ar www.sahab-alkher.com/vb
www.sahab-alkher.com/vb groups.google.com/group/sahab-
alkher/subscribe?hl=ar_sa
```

An example of abusive URL data feeds is as follows:

```
down155505.cdn.xinruicn.com/_down1/install_it2.exe 1      1
   MALW:090:0:0
```

When IP reputation service 110 receives the data from the various data sources, data joiner 210 joins the data and segments the data on individual abuse vectors. This provides a result set that is provided to, and further processed by the data aggregator 212. Specifically, data aggregator 212 aggregates the result set and pivots the result set on the host IP address. Pivoting the result set on the host IP address effectively transforms a normalized result set into a less normalized but more compact version that can facilitate identification of IP addresses associated with abuse vectors. This produces a result set that is then processed by data combiner 214.

The data combiner 214 combines the result set received from data aggregator 212 with additional data including data associated with dynamic pools, proxy characteristics of IP addresses and IP address ranges. A pool is defined as a grouping of subnets within an IP address space. An example of a dynamic pool is as follows:

```
#fields:poolId,poolCount,subnet,turnoverAvg,turnoverStdDev,RawTurnove
rAvg,RawTurnoverStdDev 103119021056    32    213.191.4.0/24    48.000
    0.000 12.67026.918
```

Examples of dynamic proxy and static IP addresses are given below:

```
1.9.4.0/24     3   48         1   32
1.9.4.130      2   241.057    85  65  11/12/2010 10:06:00 PM
1.23.2.19      1   52.164 113  20  8
```

The result set from the data combiner 214 is then augmented with intelligence data on both the dynamic pool and autonomous system number (ASN) boundaries. An example of ASN sample data is as follows:

```
ASN_Export\
Date           ASN         ASN St IP       ASN
End IP         St IP       EndIP
Num ASN IPs
2010-09-10,    80,         50331648,
67108863,      50331648,
67108863,      16777472
```

This augmented data then serves as the host IP reputation data 218 which is consumed by the host IP reputation service 110 to enable client components to query on a particular specified host IP address.

Figure 3:
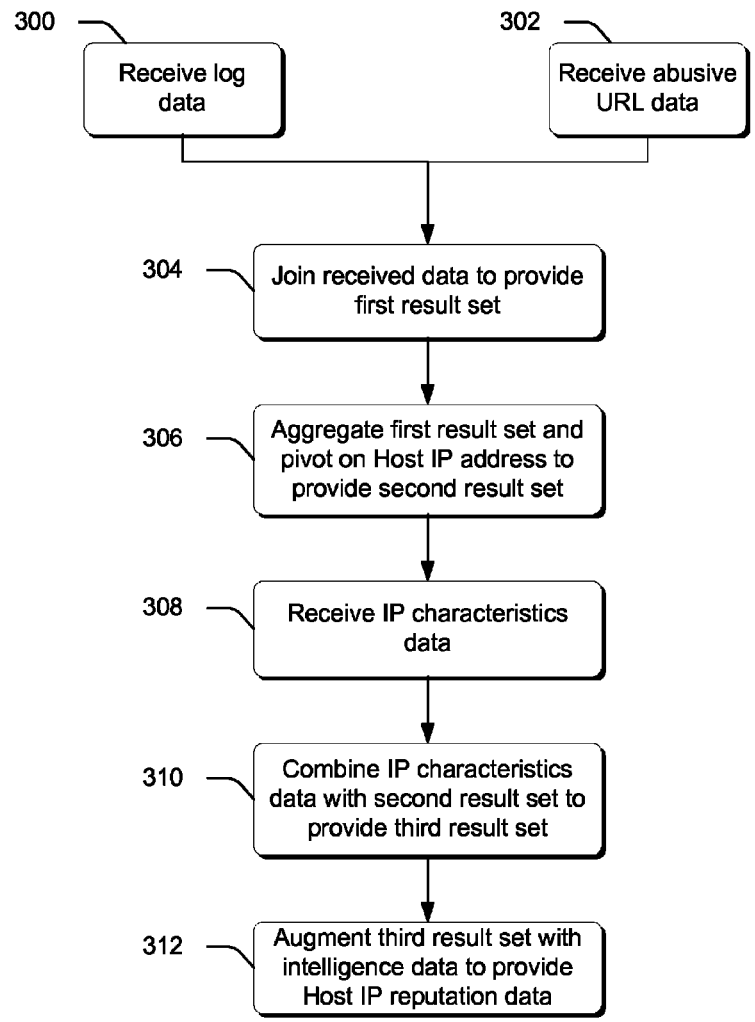
FIG. 3 is a flow diagram that describes steps a method in accordance with one or more embodiments.

As a specific example of a workflow undertaken by the IP reputation service 110, consider FIG. 3.

FIG. 3 is a flow diagram that describes steps a method in accordance with one or more embodiments. The method can be implemented in connection with any suitable hardware, software, firmware, or combination thereof. In at least some embodiments, the method can be implemented by a suitably-configured IP reputation service, such as the one described above and below.

Step 300 receives log data. Any suitable type of log data can be received from any suitable type of data source. In the illustrated and described embodiment, the log data can include URL traffic log data examples of which are provided above. Step 302 receives abusive URL data. Any suitable type of abusive URL data can be received from any suitable type of data source. The abusive URL data can include, by way of example and not limitation, URL listings associated with phishing sources, malware sources, SPAM sources, URL abuse sources and the like.

Step 304 joins the data feeds received in steps 300, 302 to provide a first result set. In this example, the first result set can be represented as follows:

{URL Metadata, Host IP, Host Name, AbuseType}

An example of data represented in this result format is as follows:

---
MALW:090:0:0, 12.23.3.5, badsite.com, malware
PHSH:100:0:0, 12.3.45.23, phisher.com, phishing
---

The joined log data and abusive URL data are segmented on each abuse vector to produce the above-represented result set.

Step 306 aggregates the first result set and pivots the result set on the Host IP address to produce a second result set that is represented as follows:

{Host IP, Abuse Count, AbuseType, URL Metadata List}

This provides all of the rows for a particular IP. In this example, the Abuse Count represents the total abuse count observed for a particular Host IP address. The URL Metadata List is a list of all URLs seen on that particular IP. Grouping is done by IP to provide this information. For example, using this approach, one can find over one million URLs linked to a single IP.

Step 308 receives IP characteristics data. Any suitable type of IP characteristics data can be received. In the illustrated and described embodiment, the IP characteristics data includes data associated with dynamic pools, ASN, proxy characteristics of IP addresses, and IP address ranges. Step 310 combines the IP characteristics data on the Host IP to produce a third result set represented as follows:

{Host IP, Abuse Count, AbuseType, IP Metadata, URL Metadata List}

In this example, the combine process of step 310 adds the "IP Metadata" to the result set. Step 312 augments the third result set with intelligence data associated with both dynamic pools and ASN boundaries. The intelligence data provides additional characteristics on a particular IP address. For example, we know the rate at which this IP address is reassigned to other users on a network. We also know the routing topologies used to get to this IP address on the internet and the rate at which this changes over time. As will be appreciated, this aids in identifying when ratings are not to be used and when they can be used pro-actively based on past history.

The augmented result set provides output that serves as Host IP reputation data which is consumed by the Host IP reputation service to enable client components to query on a particular specified Host IP.

In the illustrated and described embodiment, the above-described work flow can be executed at periodic intervals, for example, every few hours, using data source feeds spanning over one or two months of data. The work flow can be executed using a distributed computing platform to deliver intelligence data reliably and consistently. With this arrangement, the generated intelligence data serves as a snapshot that captures current existing abuse hosting infrastructure on the Internet.

Further, this solution allows leverage of existing client components that work closely with URL reputation services and enables the client components to work with Host-IP reputation services, as well as URL reputation services. As an example of how various client components can interact with the above-described Host-IP reputation service, consider FIG. 4.

Figure 4:
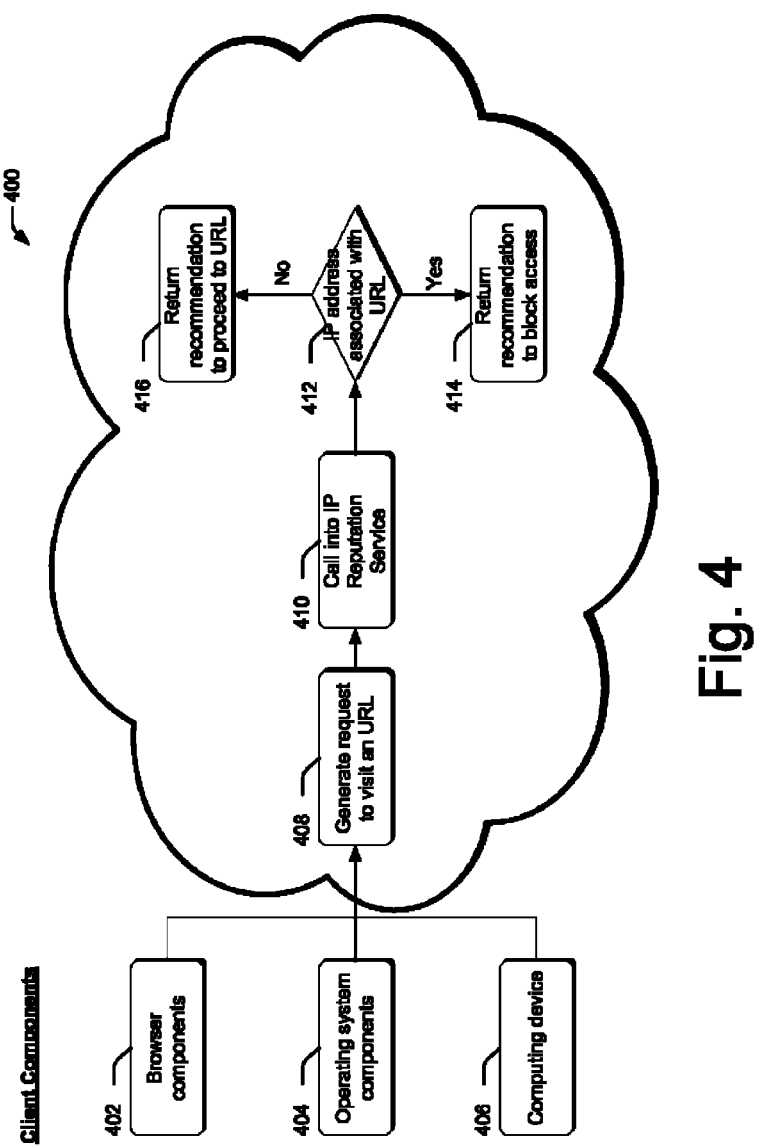
FIG. 4 illustrates client component interaction with an IP reputation service in accordance with one or more embodiments.

FIG. 4 illustrates, generally at 400, client component interaction with an IP reputation service in accordance with one or more embodiments. Any suitable type of client component can take part in the illustrated interaction. In the present example, client components include, by way of example and not limitation, browser components 402 such as a web browser or components thereof including native components and/or third party plug-in components, operating system components 404 such as a firewall component, and/or various devices 406 including mobile devices.

In operation, a client component can generate a request to visit a particular URL at step 408. Responsive to the request to visit the particular URL, step 410 calls into the IP reputation service and includes the URL that is desired to be visited.

The IP reputation service receives the call and step 412 ascertains whether there is an IP address associated with the URL that is desired to be visited. This step is performed utilizing the host IP reputation data, such as that illustrated at 218 in FIG. 2. If so, step 414 returns a recommendation to block access to the URL. If, on the other hand, the IP address associated with the URL is not found by the IP reputation service, step 416 returns a recommendation to proceed to the URL.

Having considered various embodiments, consider now a discussion of an example computing device that can be utilized to implement that above-described IP reputation service.

Example System

Figure 5:
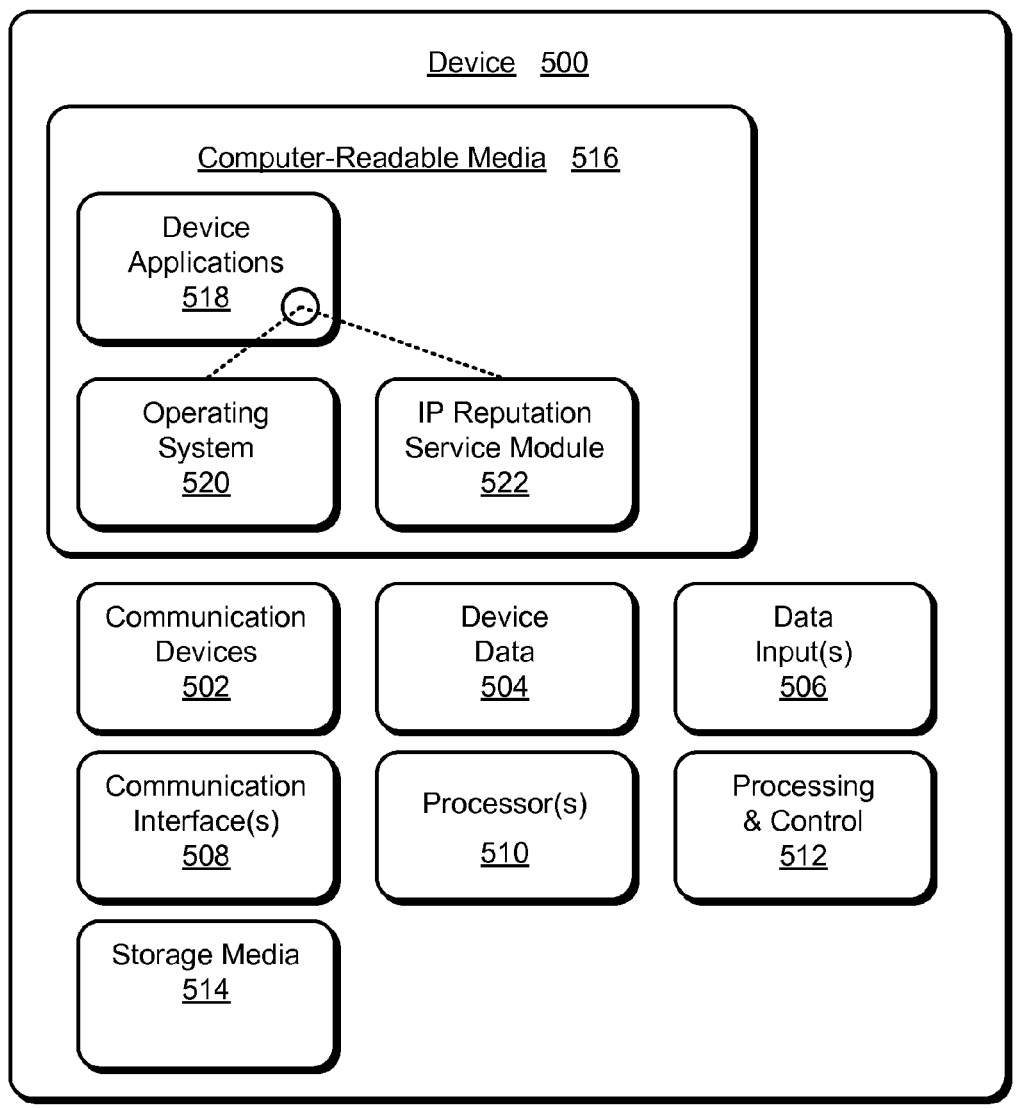
FIG. 5 illustrates an example system that can be used to implement one or more embodiments.

FIG. 5 illustrates various components of an example device 500 that can be implemented as any type of portable and/or computer device as described with reference to FIG. 1, to implement embodiments of the IP reputation service as described herein. From a server's standpoint, multiple servers can be utilized to implement the IP reputation service in a distributed fashion. For example, some servers might serve as data collection mechanisms to collect data from various data sources, and then forward collected data on to a central server that manages and oversees the IP reputation service.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, data from various data sources as described above, and any other type of audio, video, and/or image data received from any content and/or data source. User-selectable inputs include one or more input mechanisms by which a user can interact with the device. A user-selectable input mechanism can be implemented in any suitable way, such as a keyboard, a button, a stylus, a touch screen, a mouse, voice input, and the like.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and, in server scenarios, to implement the IP reputation service as described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable storage media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 516 provides data storage mechanisms to store the device data 504, as well as various device applications or platforms 518 and any other types of information and/or data related to operational aspects of device 500. For example, an operating system 520 can be maintained as a computer application with the computer-readable media 516 and executed on processor(s) 510. The device applications or platforms 518 can include a device manager (e.g., a control application, software application, signal processing and control module, code that is native to a particular device, a hardware abstraction layer for a particular device, etc.). The device applications or platforms 518 also include any system components or modules to implement embodiments of the IP reputation service. In this example, the device applications or platforms 518 include IP reputation service module 522 that is shown as a software module and/or computer application. The module 522 is representative of software that is configured to implement the functionality described above.

Alternatively or in addition, the module 522 can be implemented as hardware, software, firmware, or any combination thereof.

CONCLUSION

Various embodiments described above are directed to identifying abuse-hosting services at their source, rather than using such intermediaries as URLs and associated domains. In one or more embodiments, threats can be blocked by using the Internet protocol (IP) address of an identified attacker that is hosting content associated with abuse.

In at least some embodiments, an IP reputation service hosts information associated with various IP addresses that have been identified to host abuse content such as malware, phishing content, and/or spam, to name just a few. This information can then be used to block or warn end-users that particular IP addresses that are serving a request have been identified to host abuse content. In at least some embodiments, the IP reputation service can work with and coexist with current URL-based solutions that are already in place.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving and joining log data associated with abuse content and abusive URL data to provide a first result set;
   pivoting the first result set on Host IP address to produce a second result set;
   receiving IP characteristics data and combining the IP characteristics data with the second result set to produce a third result set;
   augmenting the third result set with intelligence data associated with dynamic pools and ASN boundaries to provide IP reputation data;
   hosting information associated with various IP addresses that have been identified from the IP reputation data; and
   using the information to block or warn end-users that particular IP addresses that are serving a request have been identified to host abuse content.

2. The computer-implemented method of claim 1, wherein the abuse content comprises one or more of malware, phishing content, or spam.

3. The computer-implemented method of claim 1 further comprising using one or more URL-based solutions to provide at least some of said information.

4. The computer-implemented method of claim 1 further comprising receiving data associated with abuse content from multiple data sources and processing the data to provide said information associated with the various IP addresses.

5. The computer-implemented method of claim 1 further comprising receiving data associated with abuse content from multiple data sources and processing the data to provide said information associated with the various IP addresses, wherein the data comprises one or more of browser telemetry log data, service activity data, abuse instrumentation log data, mail feed data, or abuse URL data feeds.

6. The computer-implemented method of claim 1, wherein said using comprises:
   receiving a message associated with an attempt to access a particular URL;
   checking whether the URL is associated with an IP address that has been identified as one that hosts abuse content; and
   issuing at least a warning when a corresponding IP address is found for the URL.

7. One or more computer readable storage memories embodying computer-readable instructions, which, when executed, implement a method comprising:
   receiving log data associated with abuse content;
   receiving abusive URL data;
   joining said log data and said abusive URL data to provide a first result set;
   pivoting the first result set on Host IP address to produce a second result set;
   receiving IP characteristics data;
   combining the IP characteristics data with the second result set to produce a third result set;
   augmenting the third result set with intelligence data associated with dynamic pools and ASN boundaries to provide an output that serves as host IP reputation data that can be consumed by a host IP reputation service to enable client components to query on a particular specified host IP address.

8. The one or more computer readable storage memories of claim 7, wherein receiving log data comprises receiving URL traffic log data.

9. The one or more computer readable storage memories of claim 7, wherein receiving abusive URL data comprises receiving URL listings associated with one or more of: phishing sources, malware sources, spam sources, or URL abuse sources.

10. The one or more computer readable storage memories of claim 7, wherein the first result set is represented as:
{URL Metadata, Host IP, Host Name, AbuseType}.

11. The one or more computer readable storage memories of claim 7, wherein the second result set is represented as:
{Host IP, Abuse Count, AbuseType, URL Metadata List}, wherein "Abuse Count" represents a total abuse count for a particular Host IP address.

12. The one or more computer readable storage memories of claim 7, wherein the IP characteristics data includes data associated with dynamic pools, ASN, proxy characteristics of the IP addresses, and IP address ranges.

13. The one or more computer readable storage memories of claim 7, wherein the third result set is represented as:
{Host IP, Abuse Count, AbuseType, IP Metadata, URL Metadata List}, wherein "Abuse Count" represents a total abuse count for a particular Host IP address.

14. The one or more computer readable storage memories of claim 7 further comprising using the host IP reputation data to block or warn a client component that a particular host IP address has been identified to host abuse content.

15. A computing device comprising:
one or more processors;
one or more computer readable media;
an IP reputation service module embodied on the one or more computer readable media and executable, under the influence of the one or more processors to:
receive data associated with abuse content from multiple data sources and process the data to provide IP reputation data associated with various IP addresses that have been identified to host abuse content;
host the IP reputation data; and
use the IP reputation data to at least warn end-users that particular IP addresses that are serving a request have been identified to host abuse content including one or more of: malware, phishing content, or spam,
wherein the IP reputation service module comprises:
a data joiner configured to receive and join log data associated with abuse content and abusive URL data to provide a first result set;
a data aggregator configured to pivot the first result set on Host IP address to produce a second result set;
a data combiner configured to receive IP characteristics data and combine the IP characteristics data with the second result set to produce a third result set; and
a data augmenter configured to augment the third result set with intelligence data associated with dynamic pools and ASN boundaries to provide an output that serves as the IP reputation data.

16. The computing device of claim 15, wherein received data comprises one or more of browser telemetry log data, service activity data, abuse instrumentation log data, mail feed data, or abuse URL data feeds.

17. The computing device of claim 15, wherein the IP reputation service module is configured to use the IP reputation data by:
receiving a message associated with an attempt to access a particular URL;
checking the IP reputation data to ascertain whether the URL is associated with an IP address that has been identified as one that hosts abuse content; and
issuing at least a warning when a corresponding IP address is found for the URL.

18. The computing device of claim 15, wherein the first result set is represented as:
{URL Metadata, Host IP, Host Name, AbuseType}; and
the second result set is represented as:
{Host IP, Abuse Count, AbuseType, URL Metadata List}, wherein "Abuse Count" represents a total abuse count for a particular Host IP address.

19. The computing device of claim 15, wherein the first result set is represented as:
{URL Metadata, Host IP, Host Name, AbuseType};
the second result set is represented as:
{Host IP, Abuse Count, AbuseType, URL Metadata List}, wherein "Abuse Count" represents a total abuse count for a particular Host IP address, and
the third result set is represented as:
{Host IP, Abuse Count, AbuseType, IP Metadata, URL Metadata List}.

* * * * *